United States Patent [19]
Komuro

[11] Patent Number: 6,072,659
[45] Date of Patent: Jun. 6, 2000

[54] RECORDING AND/OR PLAYBACK APPARATUS HAVING A CASSETTE MOUNTED DETECTION MECHANISM MOUNTED IN A LID OF A CASSETTE MOUNTING SECTION

[75] Inventor: Toshio Komuro, Chiba, Japan

[73] Assignee: Sony Corporation, Tokyo, Japan

[21] Appl. No.: 09/031,720

[22] Filed: Feb. 27, 1998

[30] Foreign Application Priority Data

Mar. 3, 1997 [JP] Japan ..................................... 9-048011

[51] Int. Cl.[7] .................................................. G11B 5/008
[52] U.S. Cl. ........................................................ 360/96.5
[58] Field of Search ............................................ 360/96.5

[56] References Cited

U.S. PATENT DOCUMENTS 5,359,478  10/1994  Kawano .................................. 360/96.6
5,805,219   9/1998  Ejima et al. ............................. 348/375

Primary Examiner—George J. Letscher
Attorney, Agent, or Firm—Jay H. Maioli

[57] ABSTRACT

A recording and/or playback apparatus that uses a tape cassette having protrusions is equipped with a mounting section, a lid, a holder, and a detection mechanism. The mounting section is to be mounted with a tape cassette. The lid, which is to open or close the mounting section, is provided so as to be movable between a closed position for closing the mounting section and an open position for opening the mounting section. The lid is provided in front of the holder. The holder holds a tape cassette that has been inserted in the apparatus, and causes the tape cassette held by the holder to be mounted in the mounting section when the lid is moved to the closed position. The detection mechanism indicates whether a tape cassette is mounted in the mounting section. When the lid is located at the closed position, the protrusion of the tape cassette that is mounted in the mounting section manipulates the detection mechanism so that the detection mechanism projects from the front surface of the lid.

10 Claims, 17 Drawing Sheets

RECORDING AND/OR PLAYBACK APPARATUS HAVING A CASSETTE MOUNTED DETECTION MECHANISM MOUNTED IN A LID OF A CASSETTE MOUNTING SECTION

BACKGROUND OF THE INVENTION

1. Field of the Invention

The present invention relates to a recording and/or playback apparatus and, particularly, to a recording and/or playback apparatus having a function of detecting whether a tape cassette is present.

2. Description of the Related Art

A tape recording and/or playback apparatus is known in which a tape cassette is mounted in a tape cassette mounting section as a recording and/or playback section and a signal is recorded onto or reproduced from a magnetic tape of the mounted tape cassette by using a magnetic head.

In this type of recording and/or playback apparatus, a cassette lid is rotatably supported by the apparatus main body so as to open or close the tape cassette mounting side of the mounting section.

However, in the above recording and/or playback apparatus, when it is attempted to check whether a tape cassette is mounted in the mounting section while the cassette lid is closed, the inside of the mounting section is difficult to see if it is looked at obliquely through a transparent window of the cassette lid; whether a tape cassette is mounted in the mounting section cannot be checked unless the inside of the mounting section is looked at through the window of the cassette lid perpendicularly.

There are recording and/or playback apparatuses in which no transparent window is provided in the cassette lid. In this case, to check whether a tape cassette is mounted in the mounting section, a cumbersome operation of opening the cassette lid is needed each time, which is inconvenient.

When a person having weak eyes checks whether a tape cassette is mounted in the mounting section to use a recording and/or playback apparatus, he is required to open the cassette lid and grope for a cassette tape that may exist in the mounting section. In groping about in the mounting section, he may damage some of various members that are provided in the mounting section and constitute the recording and/or playback section or he may even injure his hand when touching some of those members.

SUMMARY OF THE INVENTION

An object of the present invention is therefore to provide a recording and/or playback apparatus which resolves the above-mentioned problems.

The invention provides a recording and/or playback apparatus comprising a mounting section, a lid, and a detection mechanism. The mounting section is to be mounted with a tape cassette. The lid, which opens or closes the mounting section, is provided so as to be movable between a closed position for closing the mounting section and an open position for opening the mounting section. The detection mechanism indicates whether a cassette tape is mounted in the mounting section. The detection mechanism is manipulated by the tape cassette that is mounted in the mounting section so as to project from the front surface of the lid when the lid is located at the closed position.

The invention also provides a recording and/or playback apparatus which uses a tape cassette having a protrusion and comprises a mounting section, an opening/closing mechanism, and a detection mechanism. The mounting section is provided in an apparatus main body and is to be mounted with a tape cassette. The opening/closing mechanism, which opens or closes the mounting section, comprises a lid and a holder provided with the lid on its front surface. The lid is movable between a closed position for closing the mounting section and an open position for opening the mounting section. The holder holds an inserted tape cassette and causes the inserted tape cassette to be mounted in the mounting section when the lid is moved to the closed position. The detection mechanism, which is provided in the opening/closing mechanism, indicates whether a cassette tape is mounted in the mounting section. The detection mechanism is manipulated by the protrusion of the tape cassette that is mounted in the mounting section so as to project from the front surface of the lid when the lid is located at the closed position.

DETAILED DESCRIPTION OF THE PREFERRED EMBODIMENT

A recording and/or playback apparatus according to the present invention will be hereinafter described in detail with reference to the accompanying drawings. The following embodiment of the invention is directed to a recording and/or playback apparatus which uses a tape cassette in which a magnetic tape as a recording medium is accommodated.

Figure 1:
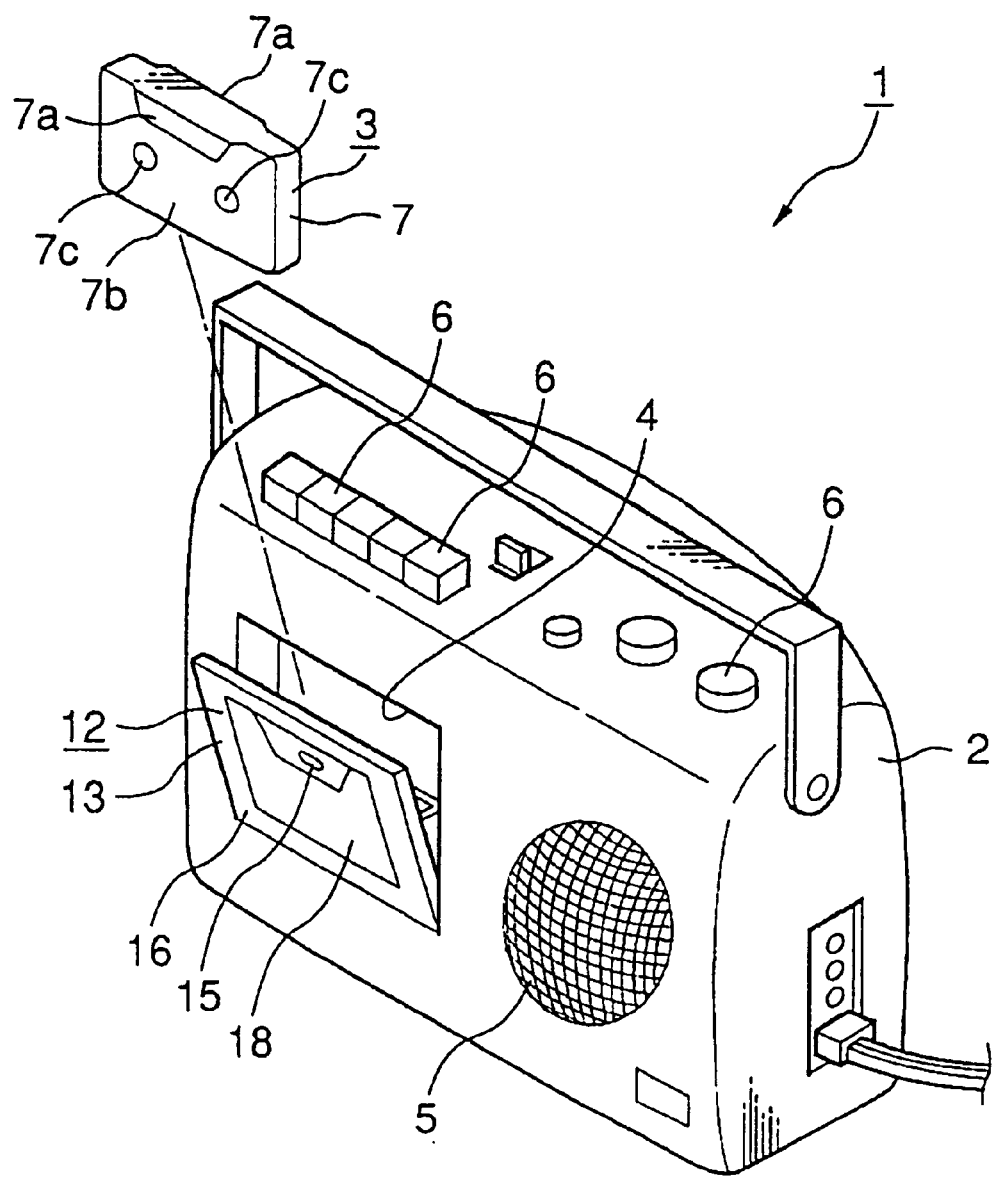
FIG. 1 is a perspective view showing an appearance of a recording and/or playback apparatus according to an embodiment of the present invention.

As shown in FIG. 1, the front surface of a main body 2 of a recording and/or playback apparatus 1 according to the invention is provided with a mounting section 4 in which a tape cassette 3 is to be mounted and a speaker section 5. The top surface of the main body 2 is provided with various kinds of manipulation switches 6 for playback, recording, volume adjustment, tone adjustment, etc.

The tape cassette 3 has a thin, box-shaped case body 7 and a pair of tape reels (not shown) on which a magnetic tape is wound and which are accommodated in the case body 7. On each of the front and rear surfaces of the case body 7, a protrusion 7a projects forward or backward slightly at a top-center position from the remaining main portion 7b. Each of the protrusions 7a is shaped like an isosceles trapezoid having a longer top base when viewed from the front or rear side. A pair of holes 7c, in which a pair of reel shafts (described later) of the mounting section 4 are to be inserted respectively, penetrate through the main portion 7b of the case body 7 at separated positions.

Figure 2:
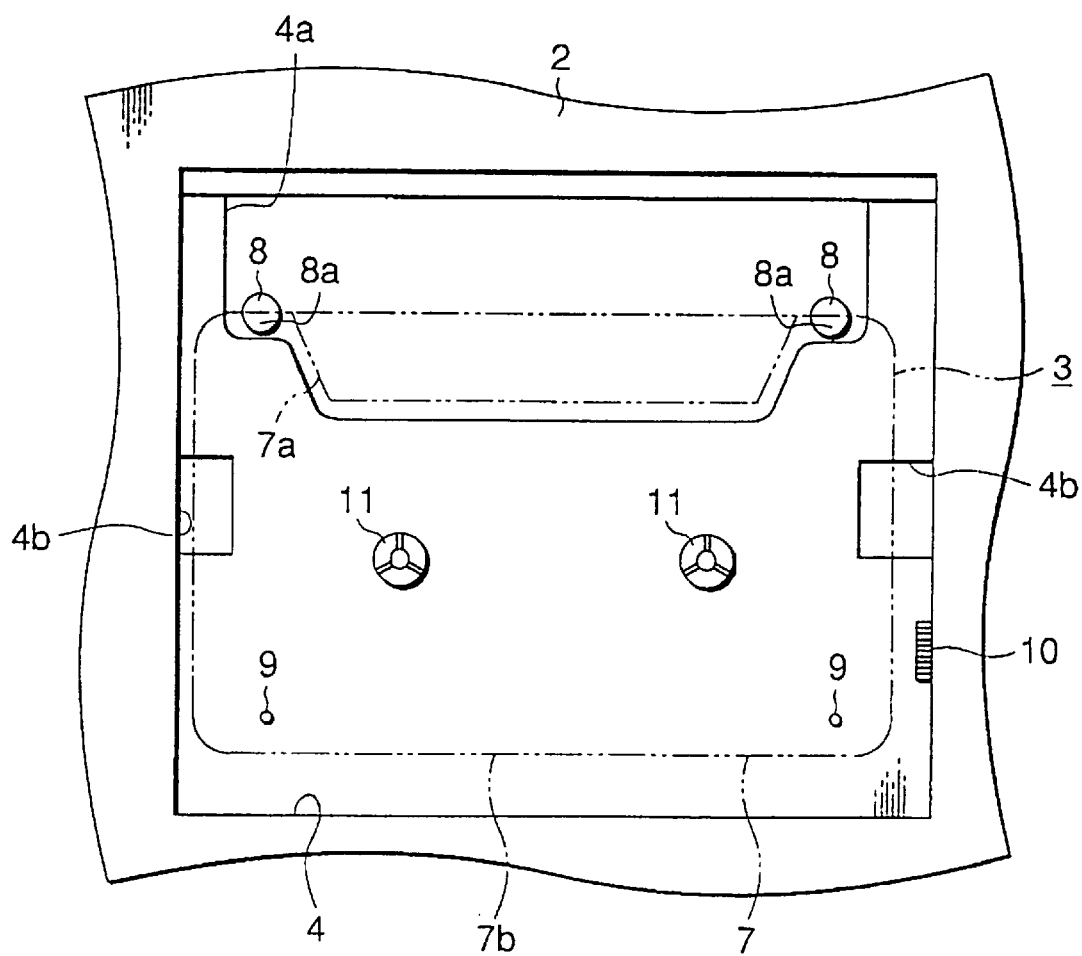
FIG. 2 is a front view of a mounting section of the recording and/or playback apparatus of the embodiment in which section a tape cassette is to be mounted.

As shown in FIG. 2, the mounting section 4 is shaped like a rectangular recess that is open at its front side. The rear surface of the mounting section 4 is formed with a shallow recess 4a at a top position. The recess 4a is shaped in such a manner that the top half is rectangular and the bottom half conforms to the protrusion 7a of the tape cassette 3. Positioning protrusions 8 project forward from the recess 4a at top-right and top-left corner positions of its top half.

Figure 17:
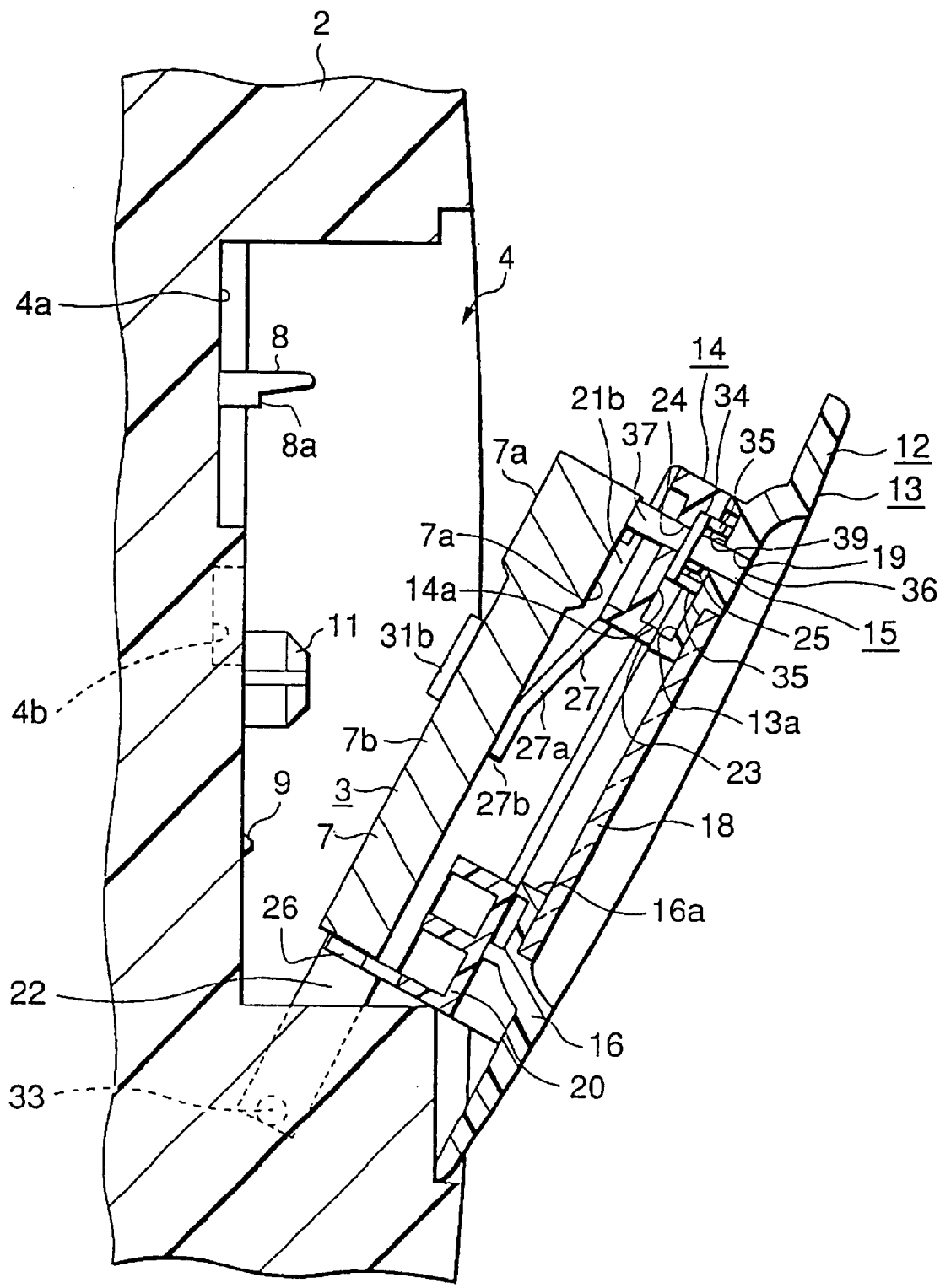
FIG. 17 is a sectional view showing a state in which the cassette lid is opened and a tape cassette is inserted in the holder unit.
Figure 18:
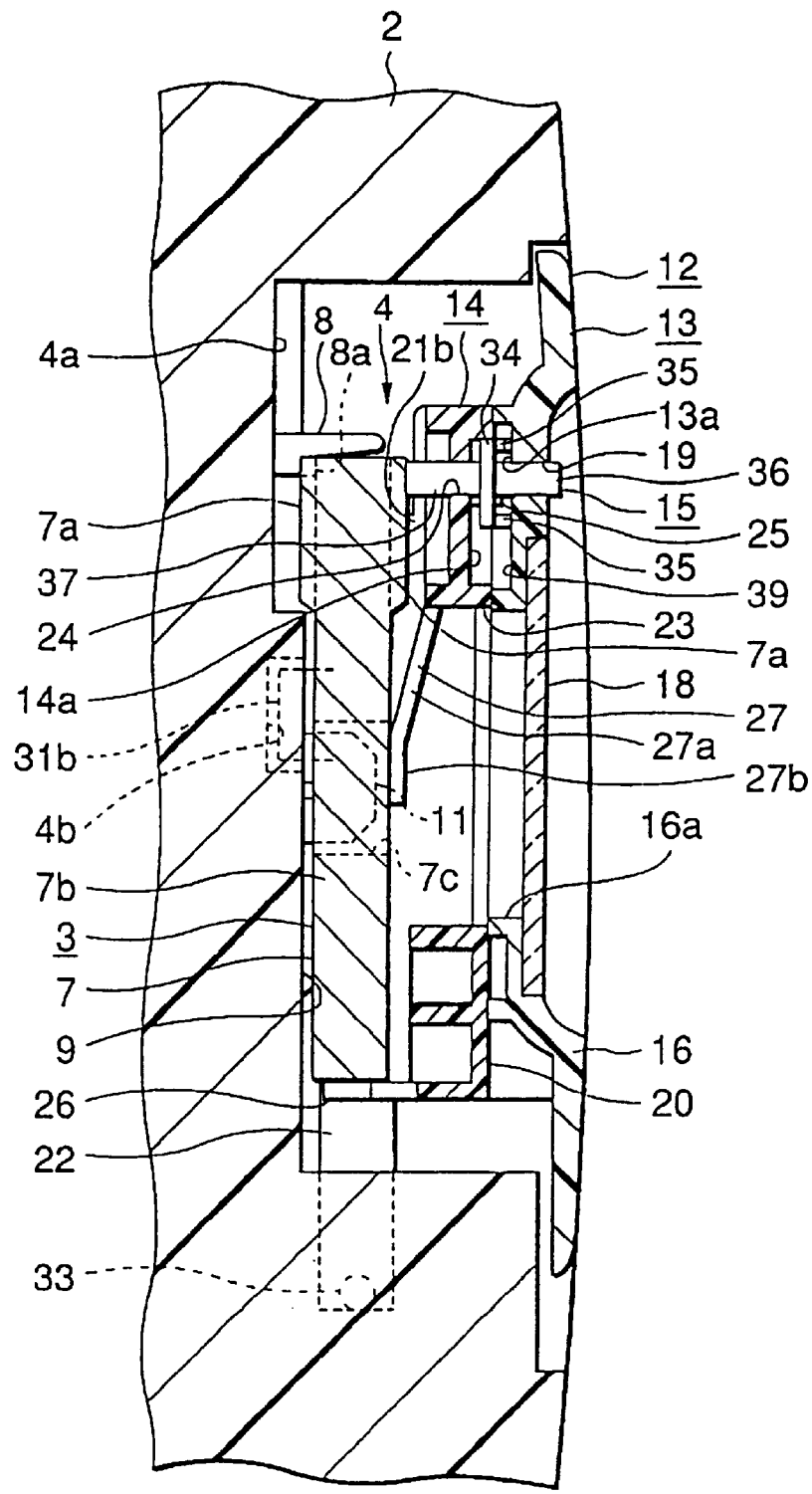
FIG. 18 is a sectional view showing a state in which the cassette lid is closed and the tape cassette is mounted in the mounting section.

As shown in FIGS. 17 and 18, the respective positioning protrusions 8 are formed, at their lower positions, with step faces 8a that face the front side. The step faces 8a are slightly deviated to the front side from the rear surface of the mounting section 4. Butting protrusions 9 project from the rear surface of the mounting section 4 at lower positions approximately under the respective positioning protrusions 8. The tip faces of the butting protrusions 9 and the step faces 8a of the positioning protrusions 8 are located in the same plane. The step faces 8a of the positioning protrusions 8 and the butting protrusions 9 play a role of butting against and thereby positioning, in the mounting section 4, the tape cassette 3 when it is mounted in the mounting section 4 as shown in FIG. 18.

As shown in FIG. 2, the main body 2 is formed with escape recesses 4b at right and left end positions of the mounting section 4 approximately in its central region in the vertical direction. A pinion 10 is supported on the right-hand side wall of the mounting section 4, and a pair of reel shafts 11 are provided at separated positions approximately in a central region in the vertical direction of the mounting section 4.

As shown in FIG. 1, a cassette lid 12 is rotatably supported by the main body 2 under the mounting section 4 and serves to open or close the front side of the mounting section 4.

Figure 3:
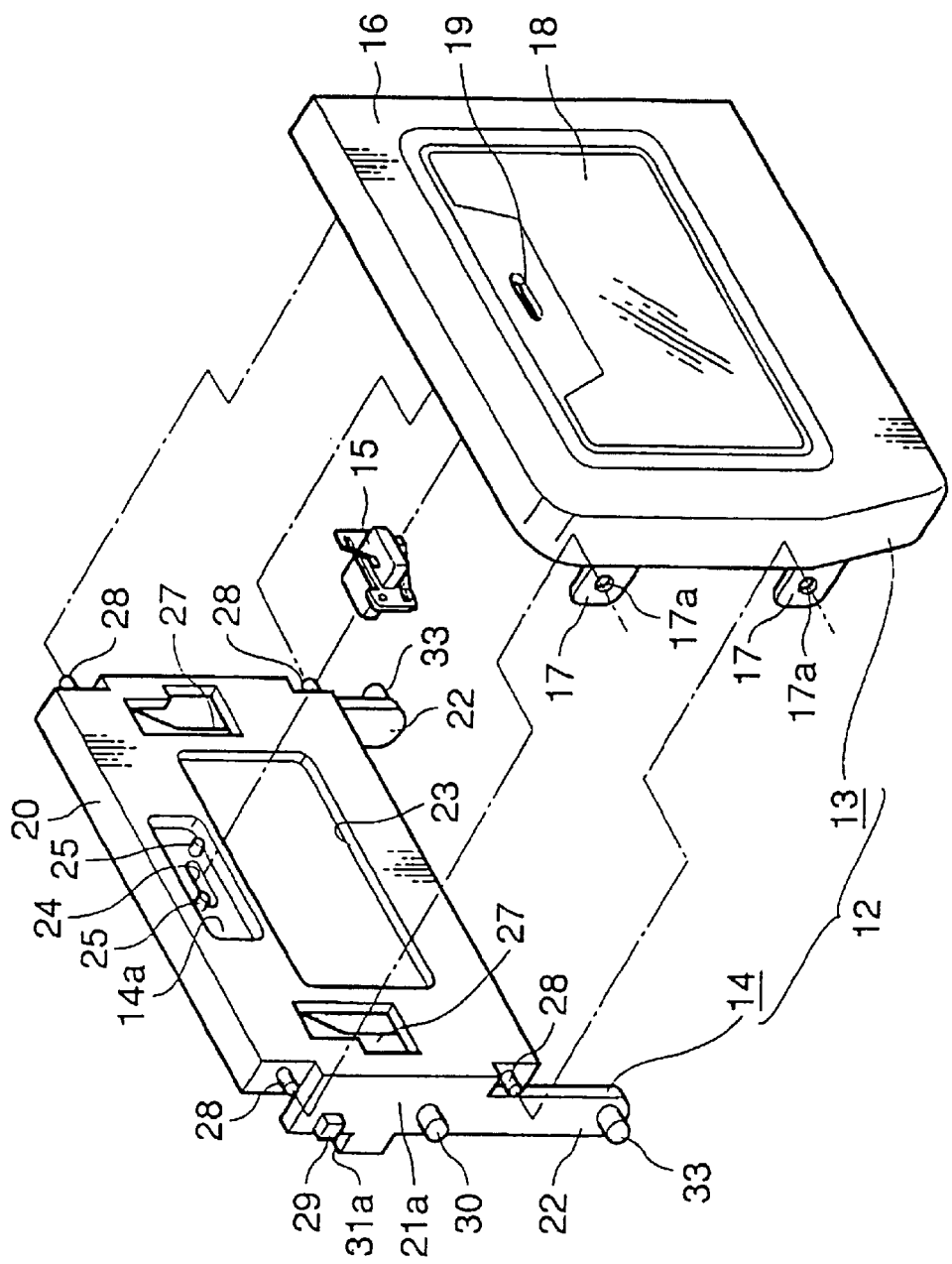
FIG. 3 is an exploded perspective view of a detection member and a cassette lid of the recording and/or playback apparatus of the embodiment.

As shown in FIG. 3, the cassette lid 12 is configured in such a manner that a lid unit 13 and a holder unit 14 are arranged in the front-rear direction and combined with each other and that a detection member 15 is held between the units 13 and 14 so as to be movable in the front-rear direction, i.e., in the direction in which the detection member 15 projects from the cassette lid 12 and the direction in which it sinks below the front surface of the cassette lid 12.

Figure 9:
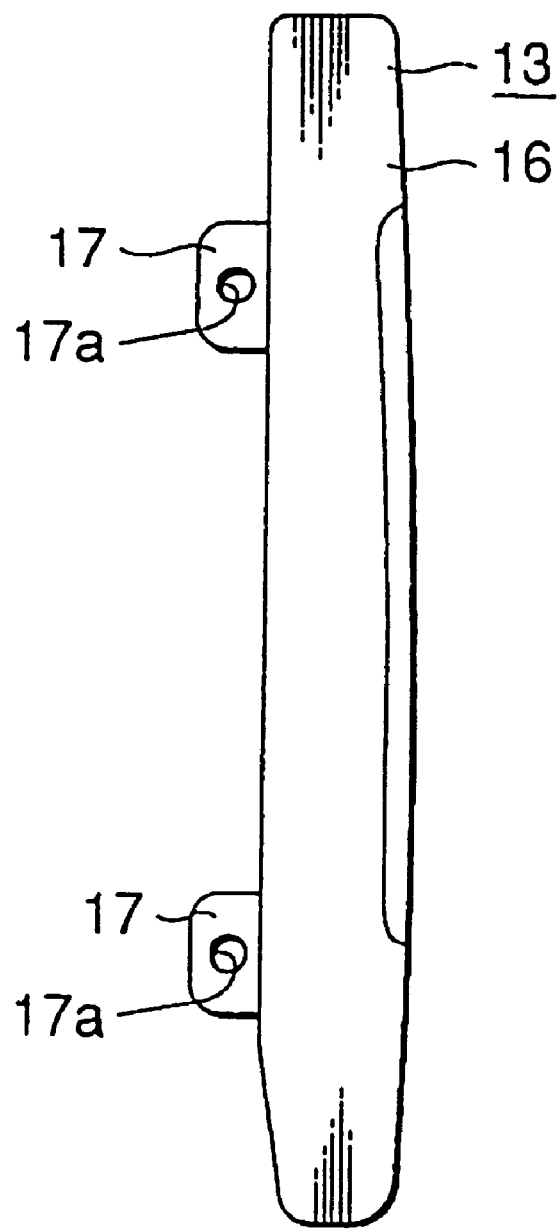
FIG. 9 is a left side view of the lid unit of FIG. 8.
Figure 10:
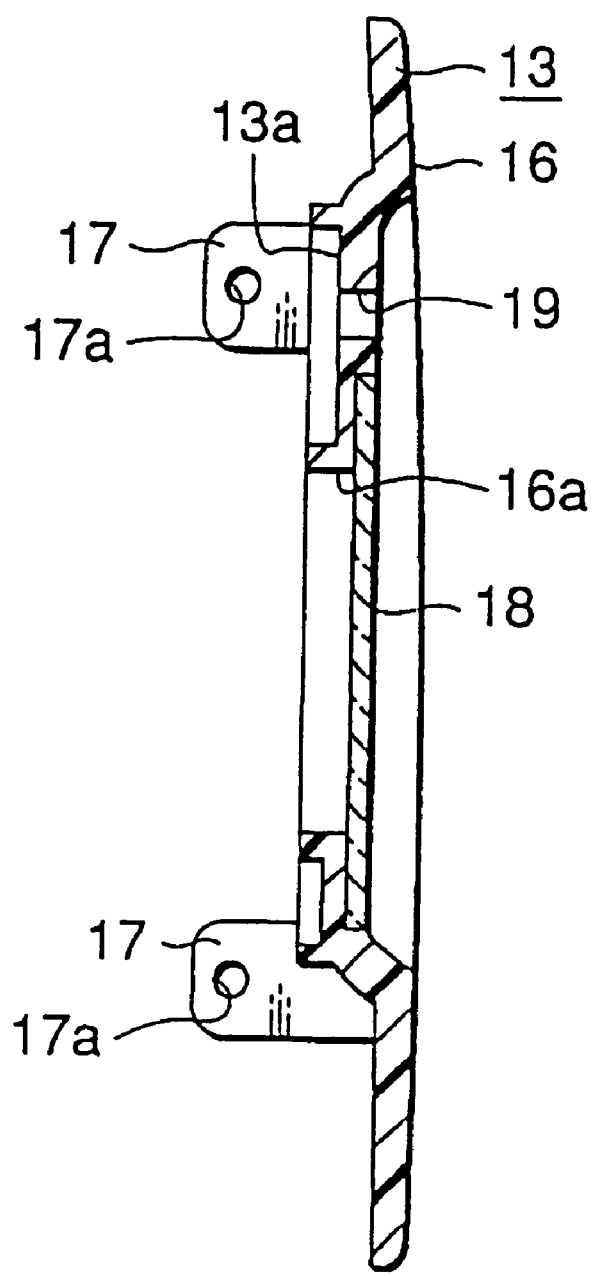
FIG. 10 is a sectional view of the lid unit of FIG. 8.

As shown in FIGS. 9 and 10, the lid unit 13 is composed of a front plate 16 that is shaped like an approximately rectangular plate, fixing pieces 17 that project rearward from the front plate 16, and a window member 18 that is attached to the front plate 16.

Figure 4:
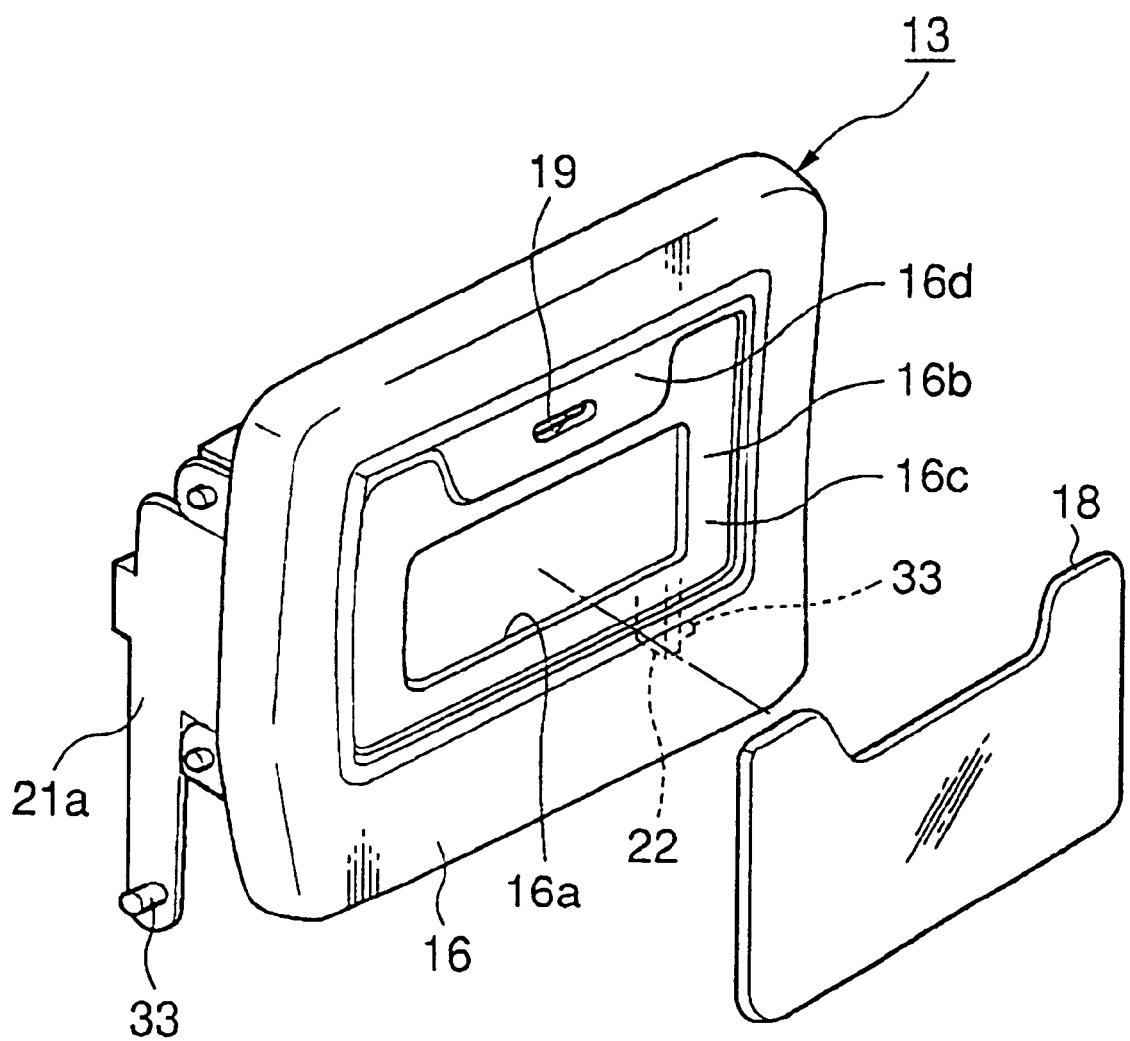
FIG. 4 shows a relationship between the cassette lid and a window member of the recording and/or playback apparatus of the embodiment.
Figure 5:
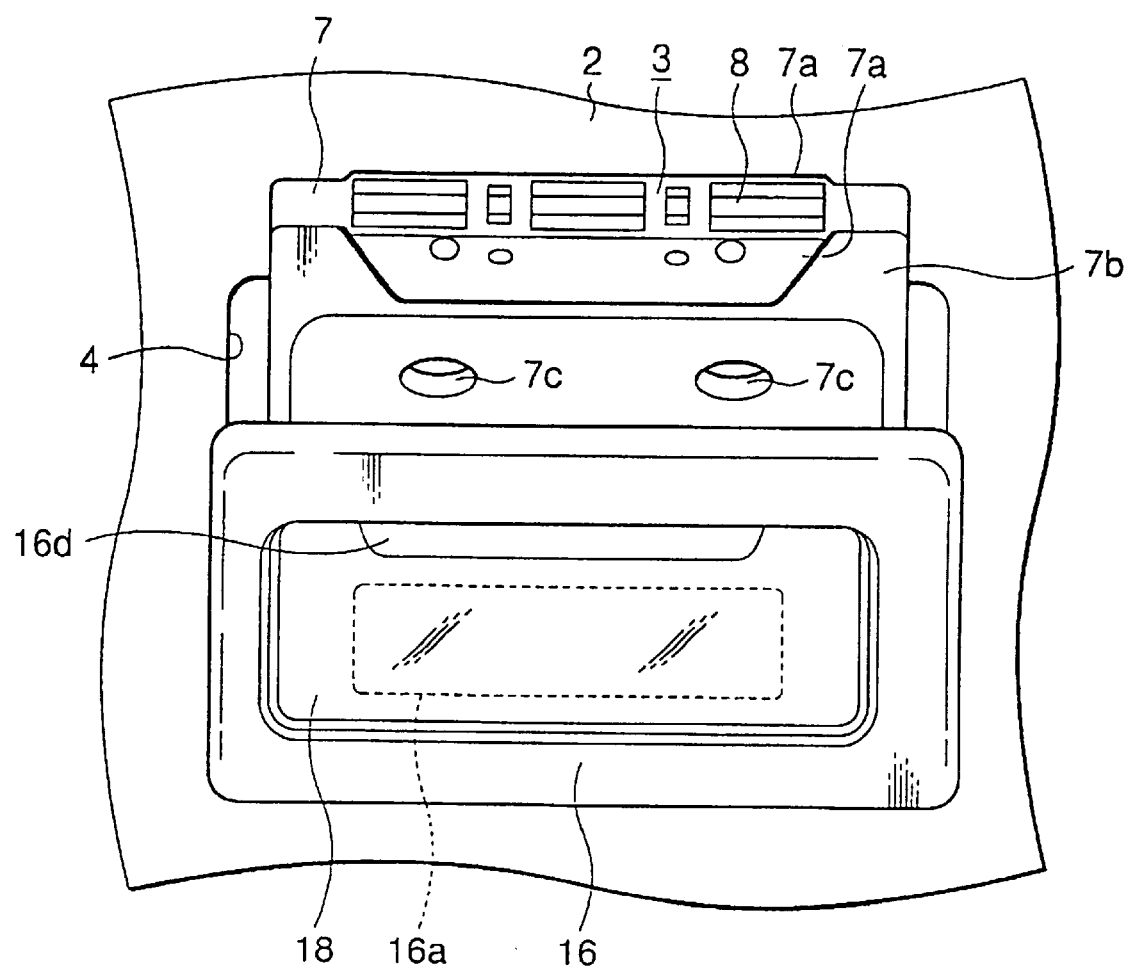
FIG. 5 shows a state in which a tape cassette is being mounted into the mounting section.

The front plate 16 is approximately rectangular when viewed from the front side, and is formed with a horizontally elongated, approximately rectangular recess 16b at its front side. As shown in FIG. 4, the recess 16b consists of a fixing portion 16c and a bulge 16d.

When viewed from the front side, the inside periphery of the fixing portion 16c has the same shape as the main portion 7b of the tape cassette 3; that is, top-right and top-left portions of the fixing portion 16c project upward from the remaining portion. A large rectangular opening 16a is formed through a dent portion of the fixing portion 16c at its central position.

The bulge 16d projects forward so as to be slightly deviated from the fixing portion 16c to the front side, and is formed in a region of the recess 16b excluding the fixing portion 16c, i.e., a top portion of the recess 16b excluding its right and left end portions. The bulge 16d has the same shape as the protrusion 7a of the tape cassette 3; that is, it is shaped like an isosceles trapezoid having a longer top base when the apparatus 1 is viewed from the front side.

As shown in FIG. 3, the window member 18 is plate-like member made of a transparent synthetic resin material. The outside periphery of the window member 18 has the same shape as the inside periphery of the fixing portion 16c of the recess 16b, and the thickness of the window member 18 is the same as the depth of the fixing portion 16c of the recess 16b. The window member 18 is bonded to the fixing portion 16c with an adhesive, for instance, so as to cover the opening 16a. The front surface of the window member 18 is flush with that of the bulge 16d of the recess 16b.

Figure 8:
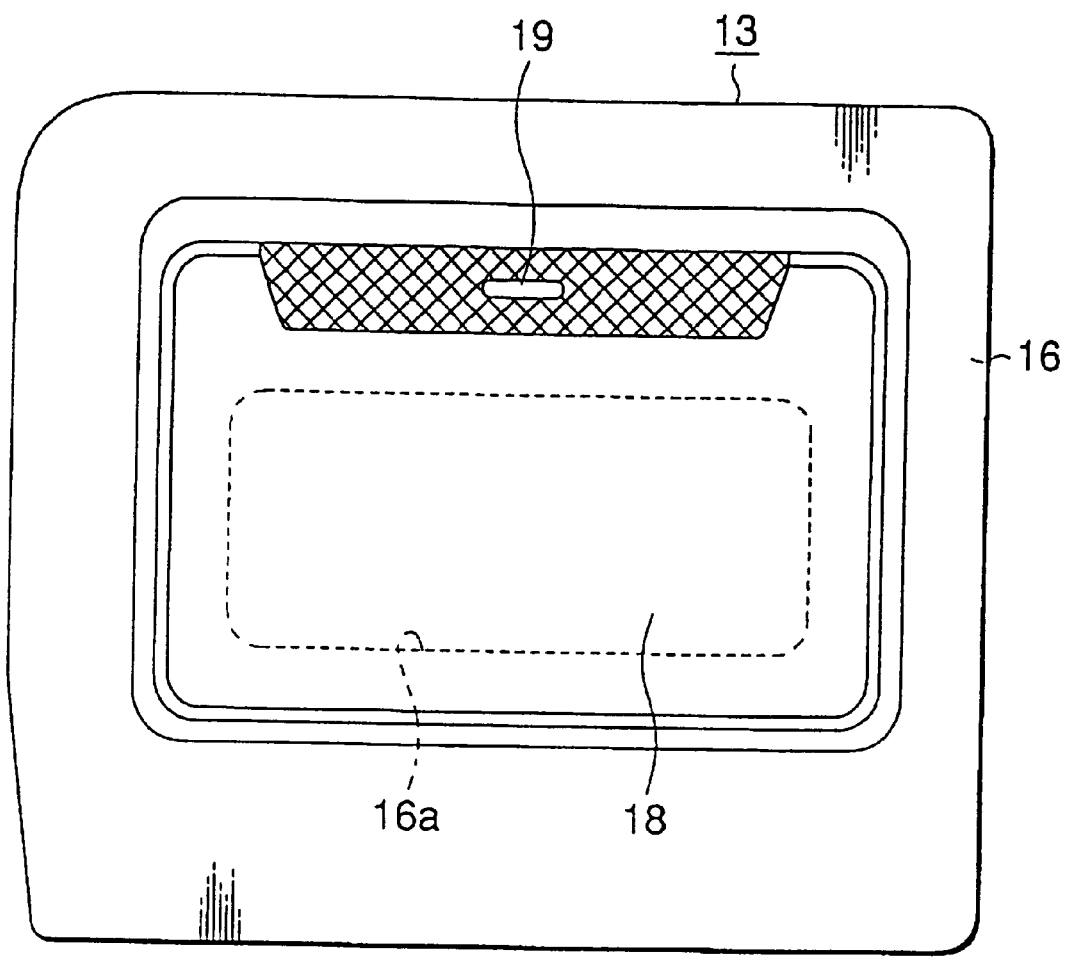
FIG. 8 is a front view showing a lid unit that constitutes the cassette lid.

As shown in FIG. 8, when the cassette lid 12 is viewed from the front side in a state that the window member 18 is fixed to the recess 16b, the bulge 16d of the recess 16b and the window member 18 are recognized as if to be shaped by tracing the outer surface of the tape cassette 3, i.e., the outer shapes of the protrusion 7a and the main portion 7b of the tape cassette 3. As a result, as shown in FIG. 4, the bulge 16d and the window member 18 play a role of an indication portion for indicating and informing a user of the apparatus 1 of a proper insertion direction in inserting the tape cassette 3 into the holder unit 14.

Figure 7:
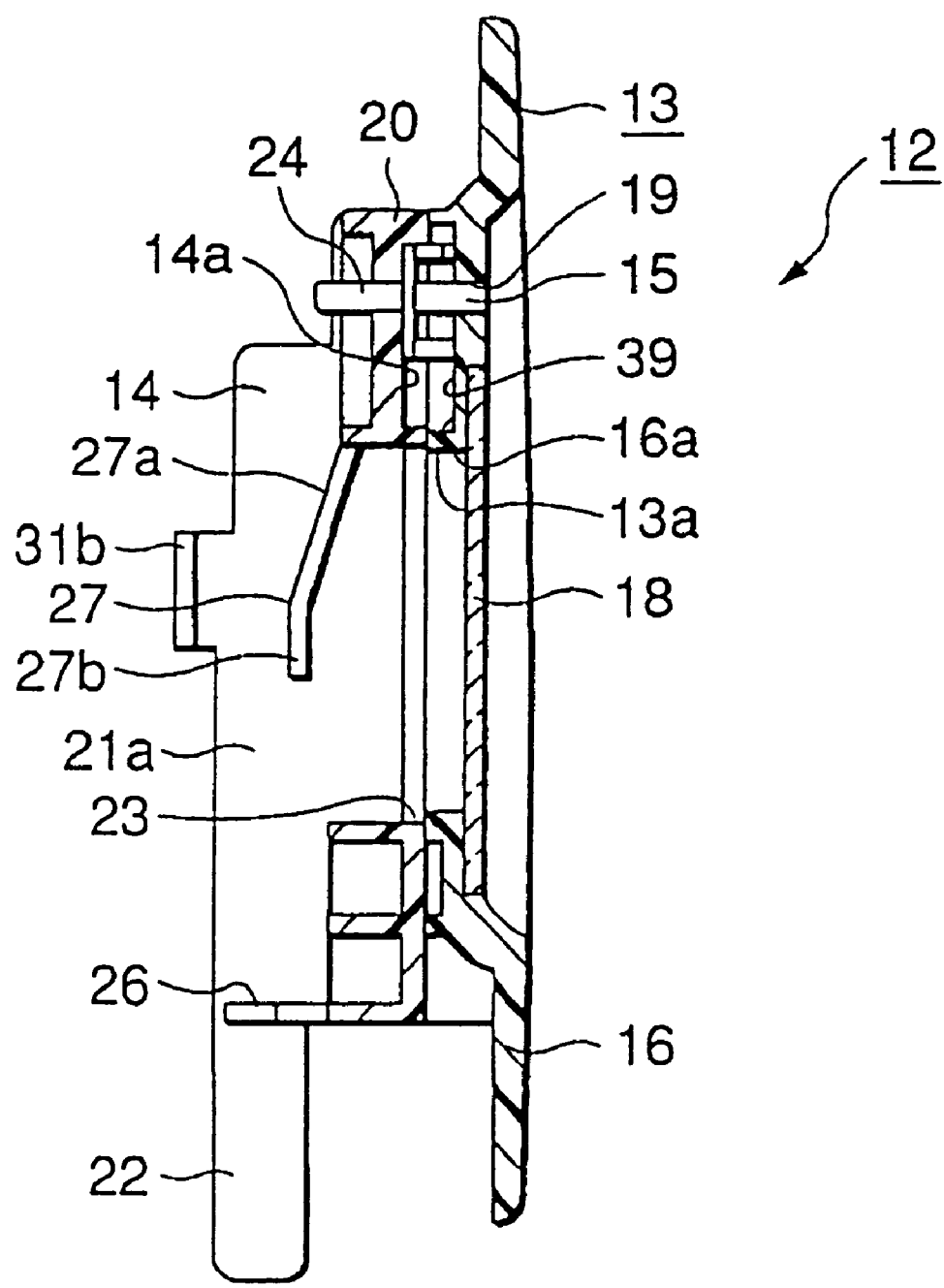
FIG. 7 is a sectional view showing a state in which the detection member is attached to the cassette lid.

As shown in FIG. 7, the rear side of the front plate 16 is formed, above a central portion in the horizontal direction of the opening 16a, with a lid-unit-side recess 13a that is open to the rear side. As shown in FIGS. 3 and 4, a long and narrow hole 19 that is long in the horizontal direction penetrates through the dent portion of the recess 13a at a central position.

The portion of the front surface of the front plate 16 around the hole 19 is given a color that causes a person who sees it to feel it to be relatively dark, i.e., a color that is low in lightness such as black.

As shown in FIGS. 3, 9, and 10, two fixing pieces 17 that are separated vertically project from each of the right and left end portions of the rear surface of the front plate 16. An engagement hole 17a is formed in each fixing piece 17 at a position close to the tip.

As shown in FIGS. 11–15, the holder unit 14 is configured by integrating a plate-like main portion 20 having an approximately rectangular outer shape, side walls 21a that extend backward from the right and left side ends of the main portion 20, and a pair of legs 22 that extend downward from the lower ends of the respective side walls 21a.

Figure 15:
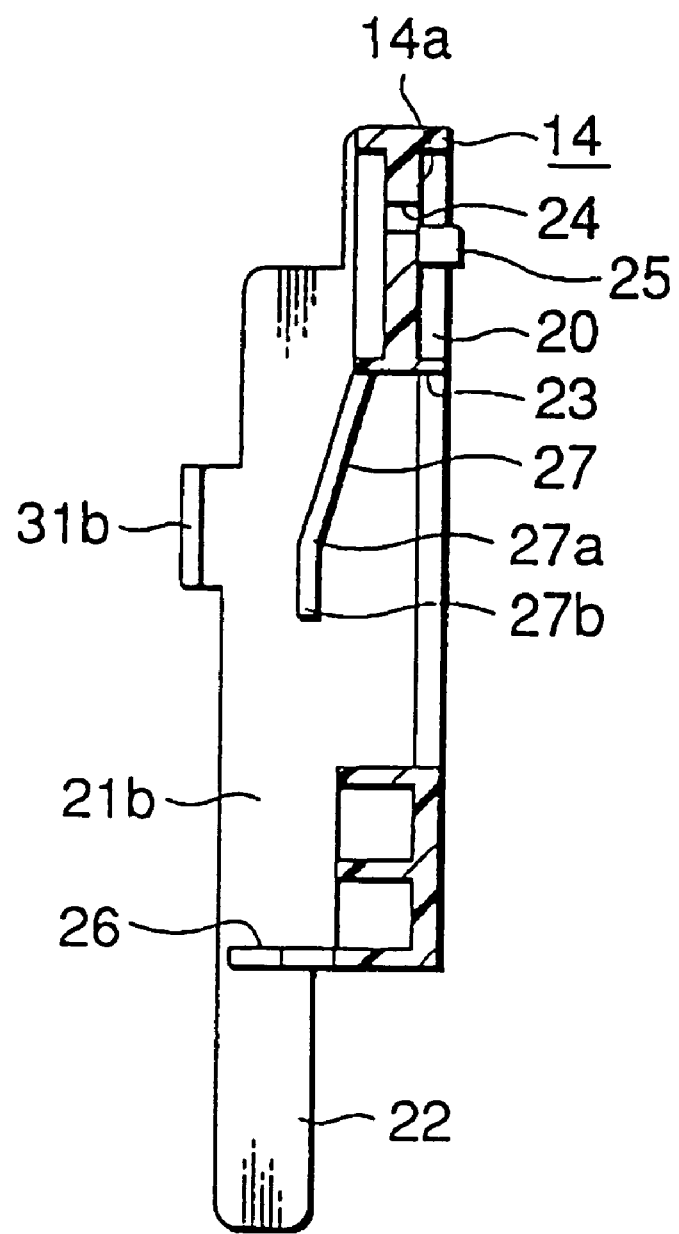
FIG. 15 is a sectional view of the holder unit of FIG. 11.

As shown in FIG. 15, a rectangular opening 23 having approximately the same size as the opening 16a of the lid unit 13 is formed through the main portion 20 at a central position. Also, a holder-unit-side recess 14a that is open to the front side is formed in the main portion 20 at a position above the rectangular opening 23 and corresponding to the lid-unit-side recess 13a of the lid unit 13. Further, an insertion hole 24 that is long in the horizontal direction is formed through the main portion 20 at a position corresponding to the hole 19. As shown in FIG. 3, two guide protrusions 25 project forward at positions distant from the insertion hole 24 to the top-left and bottom-right sides, respectively.

Figure 11:
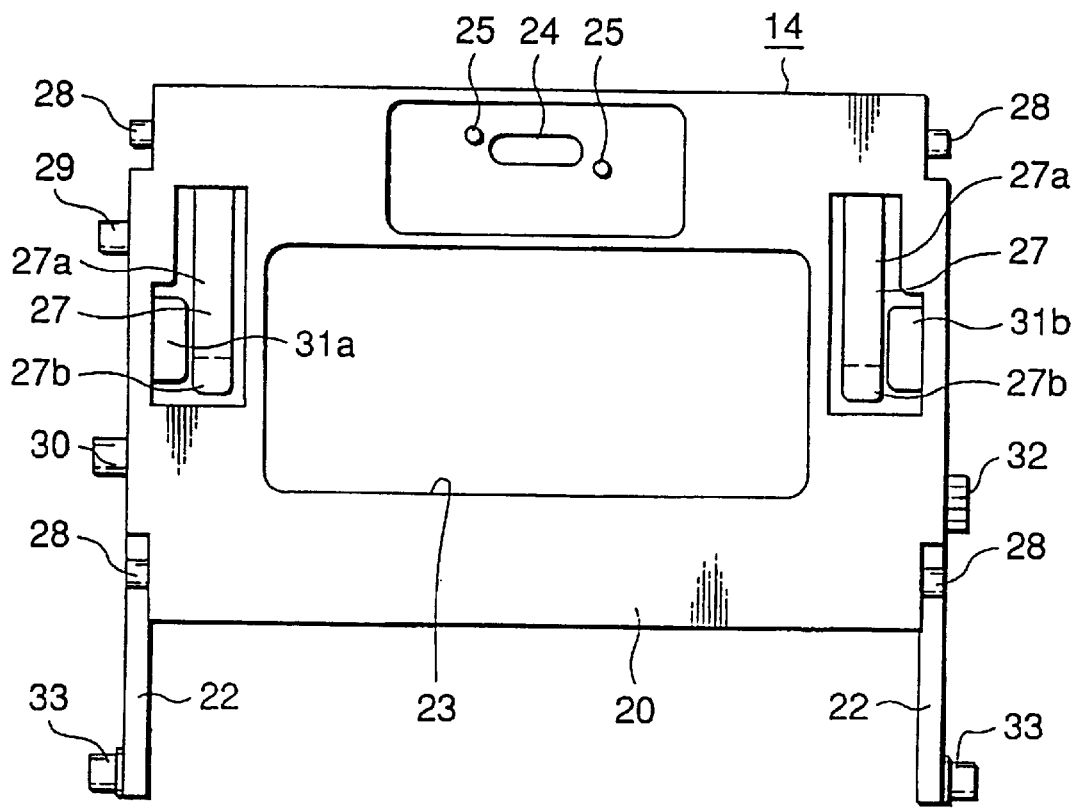
FIG. 11 is a front view of a holder unit that constitutes the cassette lid.
Figure 12:
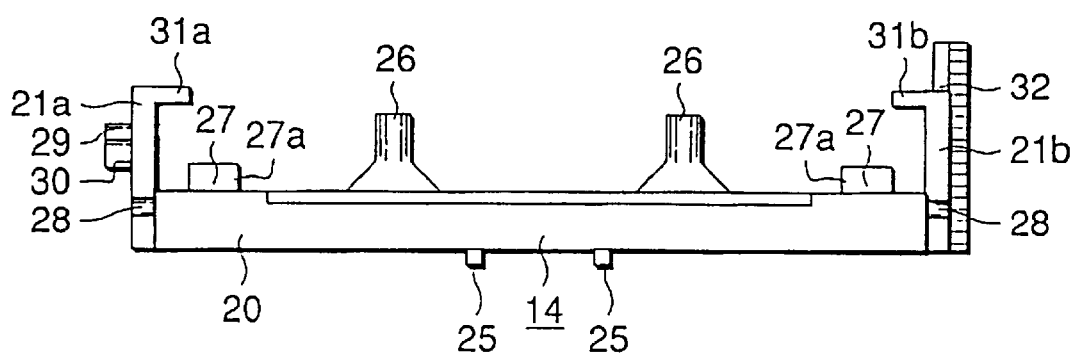
FIG. 12 is a plan view of the holder unit of FIG. 11.
Figure 13:
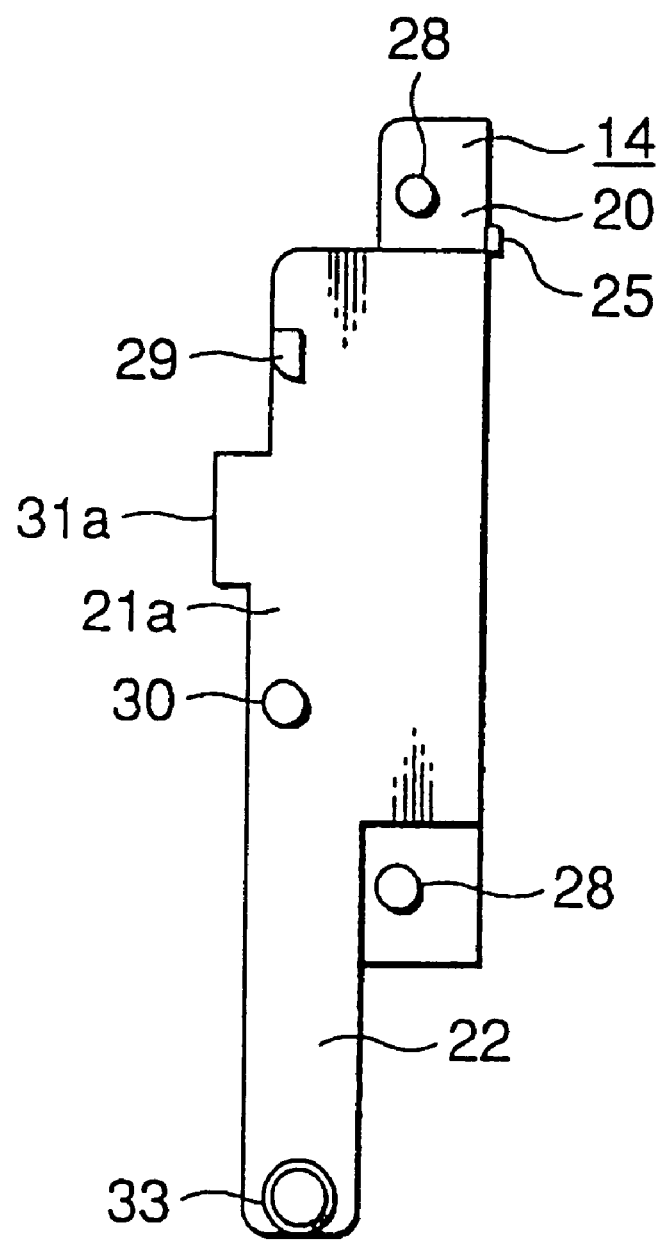
FIG. 13 is a left side view of the holder unit of FIG. 11.

As shown in FIGS. 12 and 15, receiving portions 26 that are separated from each other in the horizontal direction project from the lower end of the main portion 20. As shown in FIGS. 11 and 15, two press springs 27 project from the top portion of the rear surface of the main portion 20 at the right and left ends.

As shown in FIG. 15, each press spring 27 has an extending portion 27a that is continuous with the rear surface of the main portion 20 and is inclined so as to deviate backward as the position goes down, and a short tip portion 27b that extends downward from the lower end of the extending portion 27a.

As shown in FIG. 3, four engagement protrusions 28 to engage the engagement holes 17a of the fixing pieces 17 of the lid unit 13, respectively, project from the side faces of the main portion 20 at top and bottom positions.

As shown in FIGS. 3 and 12, an engagement piece 29 projects from the outer surface of a left-hand side wall 21a at a position close to the upper end, and a protrusion 30 to be guided projects from the outer surface of the left-hand side wall 21a at a position close to the lower end. A holding piece 31a projects rightward from the rear end of the side wall 21a at a position between the engagement piece 29 and the protrusion 30 to be guided.

Figure 14:
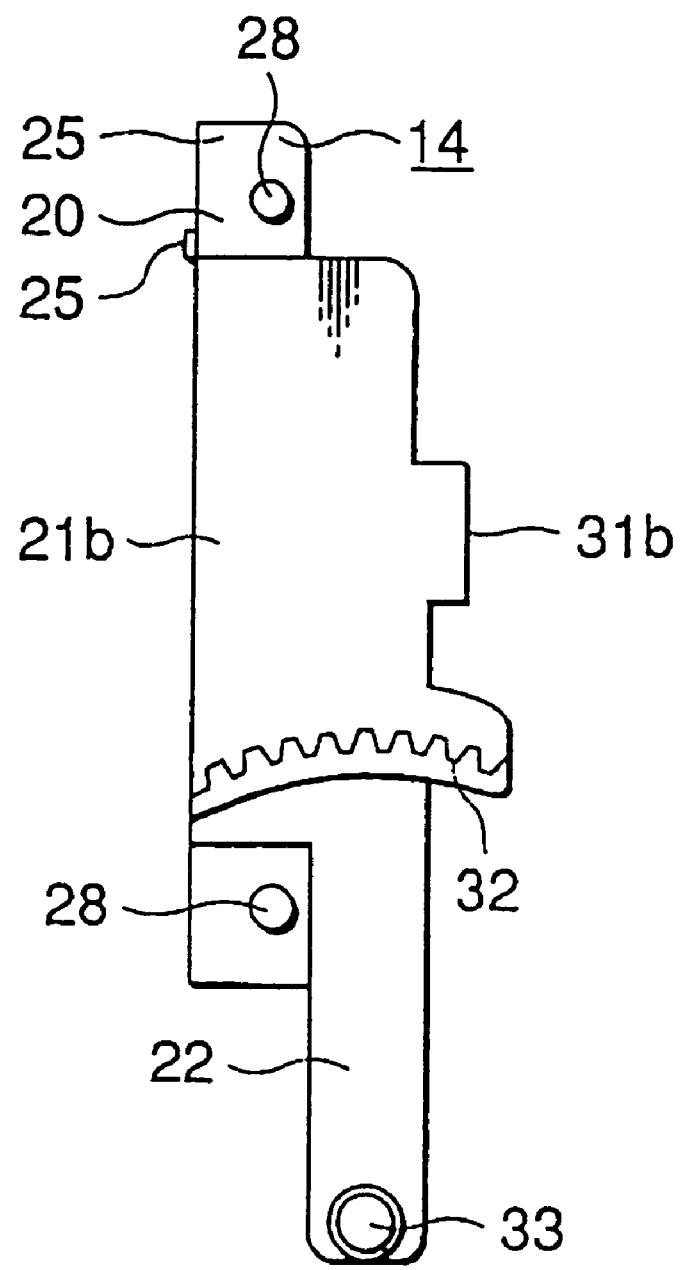
FIG. 14 is a right side view of the holder unit of FIG. 11.

As shown in FIG. 12, a holding piece 31b projects leftward from a right-hand side wall 21b at a position corresponding to the above-mentioned holding piece 31a. As shown in FIG. 14, the side wall 21b is formed, at the lower end, with a rack 32 shaped like a circular arc that is convex toward the top side when viewed from the right side, the teeth of the rack 32 being formed at the top side.

The distance between the front surface of each holding piece 31a or 31b and the rear surface of the tip portion 27b of the corresponding press spring 27 is approximately equal to the front-rear width of the tape cassette 3 in a state that the press springs 27 are not bent forward.

A pair of legs 22 project downward from the lower ends of the respective side walls 21a and 21b. The pair of legs 22 are shaped like plates that are long in the vertical direction and, as shown in FIGS. 3 and 11, are formed with respective rotary shafts 33 that project outward at the lower ends. The circular arc shape of the rack 32 (see FIG. 14) has the rotary shafts 33 serve the rotation center.

Figure 16:
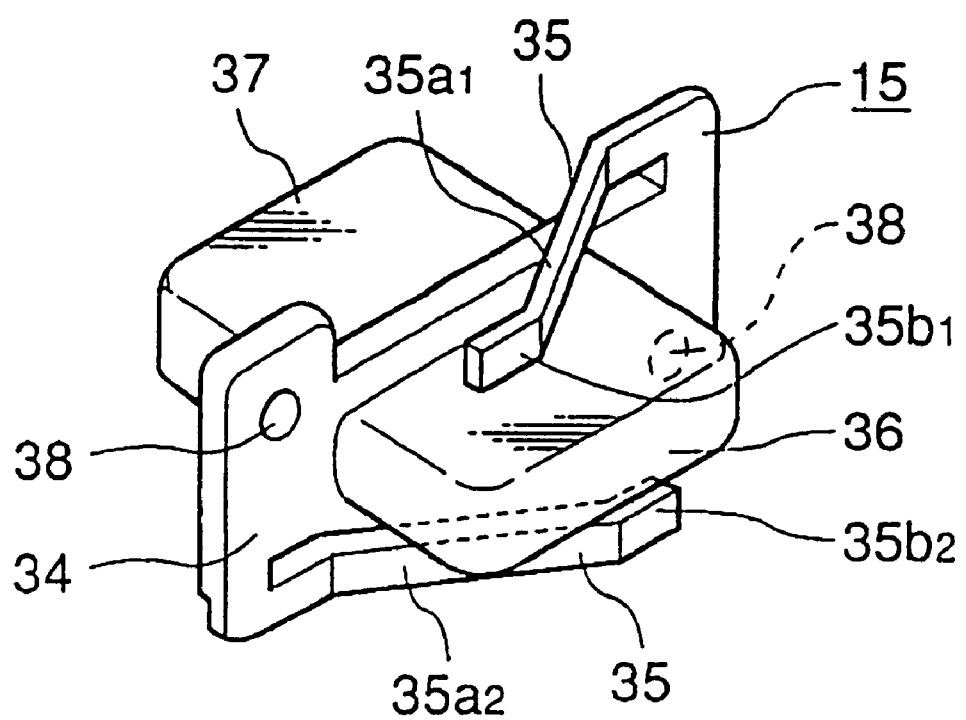
FIG. 16 is a perspective view showing the structure of the detection member.

As shown in FIG. 16, the detection member 15 is composed of a portion 34 to be pushed, two leaf spring urging portions 35, a protrusion 36, and a portion 37 to be pressed. These portions of the entire detection member 15 are integrated into a single part by using a synthetic resin of a color that causes a person who sees it to feel it to be relatively bright, i.e., a color (for instance, yellow) having higher lightness than the portion around the hole 19 of the front plate 16.

The portion 34 to be pushed is shaped like an approximately rectangular plate and has an outer shape that is larger than the hole 19 of the lid unit 13 and the insertion hole 24 of the holder unit 14 and smaller than the inside dimension of the holder-unit-side recess 14a of the holder unit 14. A pair of penetration holes 38 are formed through the portion 34 to be pushed at top-left and bottom-right positions.

The leaf spring portions 35 extend from top-right and bottom-left positions, respectively, of the portion 34 to be pushed. The leaf spring portions 35 have connecting portions $35a_1$ and $35a_2$ that are continuous with the portion 34 to be pushed and extend so as to deviate forward as their positions go leftward and rightward, respectively. The leaf spring portions 35 also have short resilient contact portions $35b_1$ and $35b_2$ that are continuous with the ends of the respective connecting portions $35a_1$ and $35a_2$ and extend in the horizontal direction. The top connecting portion $35a_1$ extends forward and leftward from a top-right position of the portion 34 to be pushed, and the connecting portion $35a_2$ extends forward and rightward from a bottom-right position of the portion 34 to be pushed.

The protrusion 36 projects from the center of the front face of the portion 34 to be pushed, and has such a lateral sectional shape as to be able to penetrate through the hole 19 of the lid unit 13. When the tape cassette 3 is mounted in the mounting section 4, the protrusion 36 projects from the front surface of the cassette lid 12 as shown in FIG. 18 and thereby carries out a function of indicating to a user that the tape cassette 3 is mounted in the mounting section The portion 37 to be pressed projects from the center of the rear face of the portion 34 to be pushed, i.e., projects in the opposite direction to the projecting direction of the protrusion 36. The portion 37 to be pressed has such a lateral sectional shape as to be able to penetrate through the insertion hole 24 of the holder unit 14. When the tape cassette 3 is mounted in the mounting section 4, the portion 37 to be pressed is pressed by one of the protrusions 7a of the tape cassette 3 and thereby carries out a function of moving the detection member 15.

Figure 6:
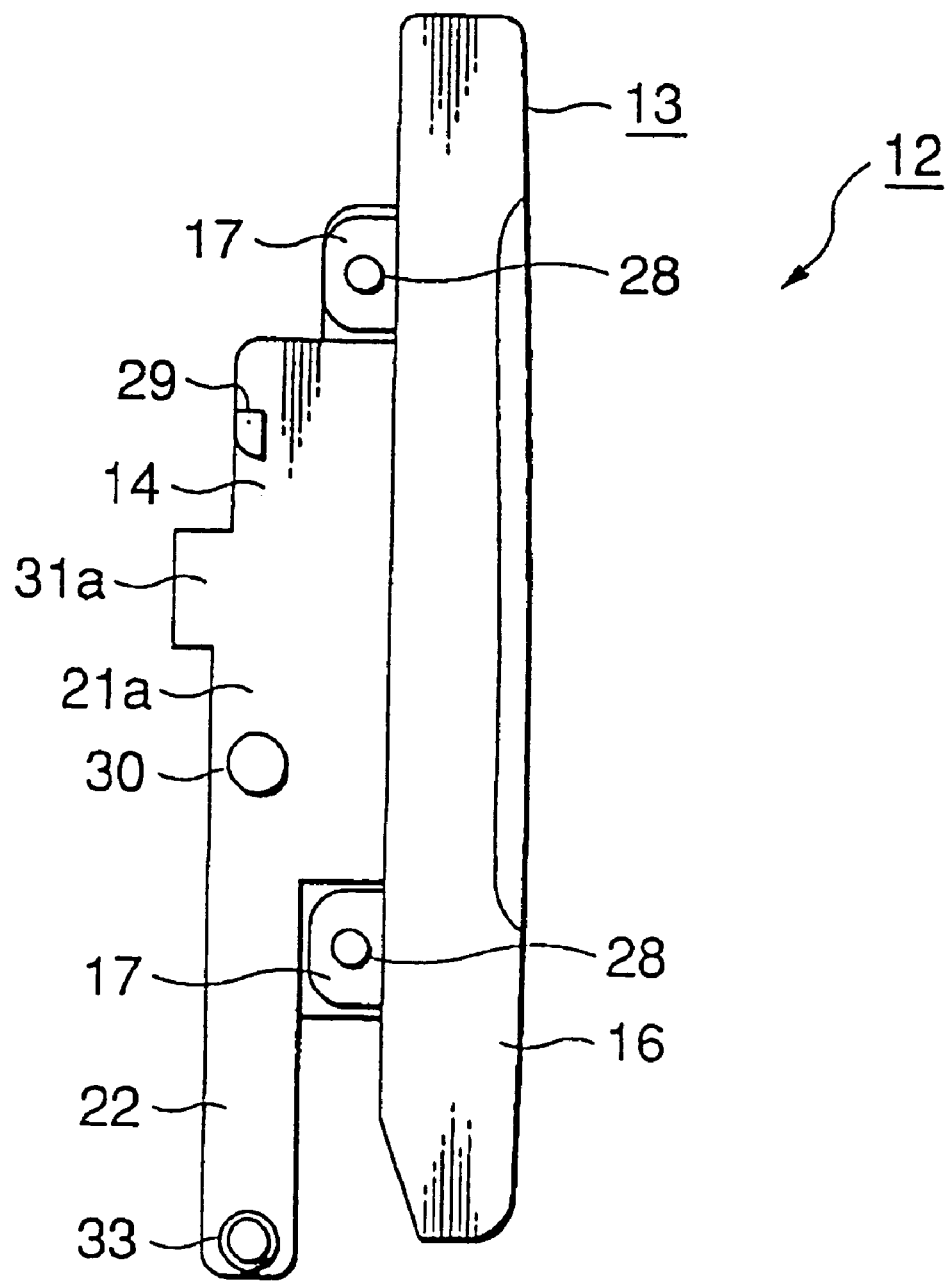
FIG. 6 is a left side view of the cassette lid.

As shown in FIGS. 6, 7 and 16, in a state that the protrusion 36 of the detection member 15 is inserted in the hole 19 of the lid unit 13, the portion 37 to be pressed is inserted in the insertion hole 24 of the holder unit 14, and the guide protrusions 25 of the holder unit 14 are inserted in the respective penetration holes 38 of the portion 34 to be pushed, the engagement protrusions 28 of the holder unit 14 engage the engagement holes 17a of the fixing pieces 17 of the lid unit 13, respectively, whereby the lid unit 13 and the holder unit 14 are connected to each other. When the lid unit 13 and the holder unit 14 are connected to each other, an accommodation space 39 is formed by the lid-unit-side recess 13a of the lid unit 13 and the holder-unit-side recess 14a of the holder unit 14 and the detection member 15 is accommodated in the accommodation space 39. Further, the resilient contact portions $35b_1$ and $35b_2$ of the leaf spring portions 35 of the detection member 15 butt the dent surface of the lid-unit-side recess 13a and the portion 34 to be pushed is pressed against and butts the dent surface of the holder-unit-side recess 14a. As a result, the tip face of the protrusion 36 is rendered flush with the front surface of the front plate 16 and the tip portion of the portion 37 to be pressed projects backward through the insertion hole 24 of the holder unit 14.

The lid unit 13 and the holder unit 14 are connected to each other as described above, and then the rotary shafts 33 of the pair of legs 22 of the holder unit 14 are rotatably supported by bearings (not shown) that are provided in the inside of the bottom wall of the mounting section 4 of the main body 2. As a result, the cassette lid 12 is rotatably supported by the main body 2 with its lower end portion serving as the supporting point, to provide a state that the mounting portion 4 can be opened or closed by the cassette lid 12 as shown in FIGS. 17 and 18.

At the same time as the rotary shafts 33 are supported by the bearings, the protrusion 30 to be guided of the side wall 21a of the holder unit 14 are engaged with a circular-arc-shaped guide groove (not shown) of the mounting section 4. The rack 32 of the side wall 21b is meshed with the pinion 10 of the mounting section 4. As a result, when the mounting section 4 is opened or closed by the cassette lid 12, the cassette lid 12 is turned while the protrusion 30 to be guided is guided by the above-mentioned guide groove that is formed in the mounting section 4 and the pinion 10 is rotated by the rack 32 that is in mesh with the pinion 10. The pinion 10 is coupled with a damper (not shown), which serves to control the opening/closing speed when the cassette lid 12 is opened or closed.

If the ejection switch among the manipulation switches 6 arranged on the top surface of the main body 2 is manipulated in a state that the cassette lid 12 is closed, the cassette lid 12 is opened as shown in FIG. 17. The resilient force of a spring (not shown) that is provided in the apparatus 1 causes clockwise (as viewed in FIG. 17) rotational force to be exerted on the cassette lid 12. When the ejection switch is manipulated, the engagement of the engagement piece 29 of the holder unit 14 with an engagement member (not shown) that is provided in the apparatus 1 is canceled, whereupon the above- mentioned resilient force turns the cassette lid 12 clockwise. At this time, the rotation speed of the cassette lid 12 is controlled by the damper (not shown) that is in mesh with the pinion 10. The clockwise rotation of the cassette lid 12 is stopped at a point when the protrusion 30 to be guided engages the front end of the above-mentioned guide groove that is formed in the mounting section 4.

In a state that the cassette lid 12 has been opened in the above manner, the tape cassette 3 is inserted into the holder unit 14 while being oriented as indicated by the window member 18 and the bulge 16d (see FIGS. 3 and 4). As shown in FIG. 17, the inserted tape cassette 3 is held by the holder unit 14 in such a manner that its bottom surface contacts the receiving portions 26, the side ends of its rear surface contact the holding pieces 31a and 31b, and its front surface contacts the tip portions 27b of the respective press springs 27. When the tape cassette 3 is held by the holder unit 14 in this manner, the front-side protrusion 7a of the tape cassette 3 is rendered just in contact with the tip face of the portion 37 to be pressed of the detection member 15.

When a user of the apparatus 1 manually turns the cassette lid 12 counterclockwise (as viewed in FIG. 17) in the state that the tape cassette 3 is inserted in the holder unit 14, first the rear surface of the main portion 7b butts the butting protrusions 9. As the cassette lid 12 is further turned counterclockwise, the lower portion of the tape cassette 3 that is in contact with the butting protrusions 9 is slightly moved forward, whereby the portion of the tape cassette 3 above the portion that is in contact with the holding pieces 31a and 31b is rotated counterclockwise and slightly moved backward.

At this time, the pair of reel shafts 11 of the mounting section 4 are inserted into the respective holes 7c of the tape cassette 3.

As the cassette lid 12 is turned counterclockwise, the upper end of the rear surface of the main portion 7b butts the step faces 8a of the positioning protrusions 8 that are provided in the mounting section 4. As the cassette lid 12 is further turned, the top portion of the tape cassette 3 that is in contact with the step faces 8a is moved forward, i.e., toward the holder unit 14, against the resilient force of the press springs 27, whereby the front and rear surfaces of the tape cassette 3 are rendered approximately parallel with the mounting section 4 and the mounting of the tape cassette 3 into the mounting section 4 is completed (see FIG. 18).

As shown in FIG. 18, in the state that the tape cassette 3 is mounted in the mounting section 4, the tape cassette 3 is positioned in the holder unit 14 and the mounting section 4 in such a manner that its rear surface is in contact with the positioning protrusions 8 and the butting protrusions 9 and its front surface is in resilient contact with the press springs 27. The holding pieces 31a and 31b are located in the respective escape recesses 4b. The rear portion of the rear-side protrusion 7a of the tape cassette 3 is located in the recess 4a of the mounting section 4. The reel shafts 11 engage the tape reels of the tape cassette 3 through the holes 7c, respectively.

When the cassette lid 12 is completely closed, the engagement piece 29 of the holder unit 14 engages the engagement member (not shown) of the mounting section 4. Therefore, as long as the ejection switch is not manipulated, the cassette lid 12 does not open, that is, the state of FIG. 17 does not occur.

When the top portion of the tape cassette 3 is moved forward, i.e., toward the holder unit 14, against the resilient force of the press springs 27 as described above, the portion 37 to be pressed of the detection member 15 that has been in contact with the front-side protrusion 7a of the tape cassette 3 (see FIG. 17) is pressed forward. As a result, the portion 34 to be pushed is moved forward against the resilient force of the leaf spring portions 35 while being guided by the guide protrusions 25, and the tip portion of the protrusion 36 of the detection member 15 projects from the front surface of the cassette lid 12 through the hole 19 (see FIG. 18).

When the ejection switch among the manipulation switches 6 arranged on the main body 2 is manipulated in the state that the tape cassette 3 is mounted in the mounting section 4 as described above, the engagement piece 29 is disengaged from the engagement member (not shown) and the cassette lid 12 is turned clockwise (as viewed in FIG. 18). As the cassette lid 12 is opened, the tape cassette 3 is separated from the positioning protrusions 8 and the butting protrusions 9 and is moved backward by the resilient force of the press springs 27. As a result, the detection member 15 is moved backward by the resilient force of the leaf spring portions 35 and finally the tip face of the protrusion 36 of the detection member 15 comes flush with the front surface of the lid unit 13.

As described above, only when the cassette lid 12 is closed and the tape cassette 3 is mounted in the mounting section 4, the portion 37 to be pressed of the detection member 15 is pressed by the protrusion 7a of the tape cassette 3 and the protrusion 36 is thereby projected forward to the front side of the front plate 16 through the hole 19. On the other hand, even if the cassette lid 12 is closed in a state that the tape cassette 3 is not inserted in the holder unit 14, the protrusion 36 does not project from the front surface of the front plate 16.

In the recording and/or playback apparatus 1, as described above, when the cassette lid 12 is closed and the tape cassette 3 is mounted in the mounting section 4, the protrusion 36 of the detection member 15 projects from the front surface of the front plate 16 through the hole 19 and thereby indicates that the tape cassette 3 is mounted in the mounting section 4. When the tape cassette 3 is not mounted in the mounting section 4, the protrusion 36 does not project from the front surface of the front plate 16. Therefore, a user can easily judge, from the outside, whether the tape cassette 3 is mounted in the mounting section 4 without the need for checking presence/absence of the tape cassette 3 by opening the cassette lid 12 each time.

Also when a person having weak eyes checks whether the tape cassette 3 is mounted in the apparatus 1 or the mounting section 4, he need not grope about in the mounting section 4 to check whether the tape cassette 3 exists in the mounting section 4 or the holder unit 14; he can check presence/absence of the tape cassette 3 merely by touching the front surface of the cassette lid 12, that is, merely by checking, with his hand or finger, whether the surface is protruded because of the presence of the protrusion 36 of the detection member 15 or whether the surface is flat. Therefore, there does not occur a trouble that he damages some of various members that are provided in the mounting section 4 or injures his hand or finger when touching some of various members in or in the vicinity of the mounting section 4.

By using the detection member 15 having the leaf spring portions 35, the tape cassette 3 that is mounted in the mounting section 4 is rendered in resilient contact with the detection member 15 by the resilient force of the leaf spring portions 35. Therefore, the play in the front-rear direction in the invention can be reduced from that in the case where the tape cassette 3 resiliently contacts only the press springs 27 of the holder unit 14.

As described above, the detection member 15 is made of a synthetic resin having a color (for instance, yellow) that is higher in lightness than the color of the front plate 16, and the portion of the front surface of the front plate 16 around the hole 19 where the protrusion 36 is to be located has a color (for instance, black) that is low in lightness. Therefore, the protrusion 36 of the detection member 15 is conspicuous, whereby presence/absence of the tape cassette 3 can be judged very easily by a visual check and it can easily be judged from a distant location.

The specific shapes and structures of the respective components described in the above embodiment are just examples to be used in practicing, i.e., embodying, the invention, and it goes without saying that various modifications are possible without departing from the spirit and scope of the invention.

What is claimed is:

1. A recording and/or playback apparatus comprising:
    a mounting section for mounting a tape cassette;
    a lid for opening and closing said mounting section, said lid being rotatably supported under said mounting section and movable between a closed position for closing said mounting section and an open position for opening said mounting section; and
    a detection mechanism provided in said lid for indicating whether a cassette tape is mounted in said mounting section, said detection mechanism able to be manipulated by the tape cassette that is mounted in said mounting section so as to project from a front surface of said lid when said lid is located at the closed position,
    wherein said detection mechanism comprises a movable member having a first end and a second end, said movable member being movable by the tape cassette that is mounted in said mounting section, and wherein said lid is formed with a first insertion hole in which the movable member is inserted.

2. The recording and/or playback apparatus according to claim 1, further comprising a holder connected to said lid that moves together with said lid, for holding an inserted tape cassette and causing the inserted tape cassette to be mounted in said mounting section, said holder being provided with a second insertion hole in which the movable member is inserted, whereby the movable member is inserted in the first and second insertion holes so that the second end of the movable member projects from the second insertion hole.

3. The recording and/or playback apparatus according to claim 2, wherein said detection mechanism further comprises an urging portion for always urging the movable member in a direction of sinking the first end of the movable member below the front surface of said lid.

4. The recording and/or playback apparatus according to claim 3, wherein the movable member and the urging portion are integral with each other.

5. The recording and/or playback apparatus according to claim 1, further comprising notifying means provided on the front surface of said lid for indicating a tape cassette insertion direction.

6. A recording and/or playback apparatus which uses a tape cassette having a protrusion, said apparatus comprising:
    an apparatus main body;
    a mounting section provided in said apparatus main body for mounting a tape cassette;
    an opening/closing mechanism for opening and closing said mounting section, said opening/closing mechanism connected to said main body and comprising a lid and a holder provided with said lid on a front surface thereof, said lid being movable between a closed position for closing said mounting section and an open position for opening said mounting section, and said holder being for holding a tape cassette inserted in said apparatus and causing the inserted tape cassette to be mounted in said mounting section when said lid is moved to the closed position; and
    a detection mechanism provided in said opening/closing mechanism for indicating whether a cassette tape is mounted in said mounting section, said detection mechanism able to be manipulated by a protrusion of the tape cassette that is mounted in said mounting section so as to project from a front surface of said lid when said lid is located at the closed position,
    wherein said detection mechanism comprises a movable member having a first end and a second end, said movable member being movable by the tape cassette that is mounted in said mounting section.

7. The recording and/or playback apparatus according to claim 6, wherein said lid is provided with a first hole through which the first end of the movable member is to be projected from the front surface of said lid, and said holder is provided with a second hole through which the second end of the movable member is to be projected toward said mounting section, and wherein the movable member is disposed between said lid and said holder.

8. The recording and/or playback apparatus according to claim 7, wherein said detection mechanism further comprises an urging portion for always urging the movable member in a direction of sinking the first end of the movable member below the front surface of said lid and projecting the second end of the movable member toward said mounting section.

9. The recording and/or playback apparatus according to claim 8, wherein the movable member and the urging portion are integral with each other.

10. The recording and/or playback apparatus according to claim 6, further comprising notifying means provided on the front surface of said lid, for indicating a tape cassette insertion direction.

* * * * *